UNITED STATES PATENT OFFICE.

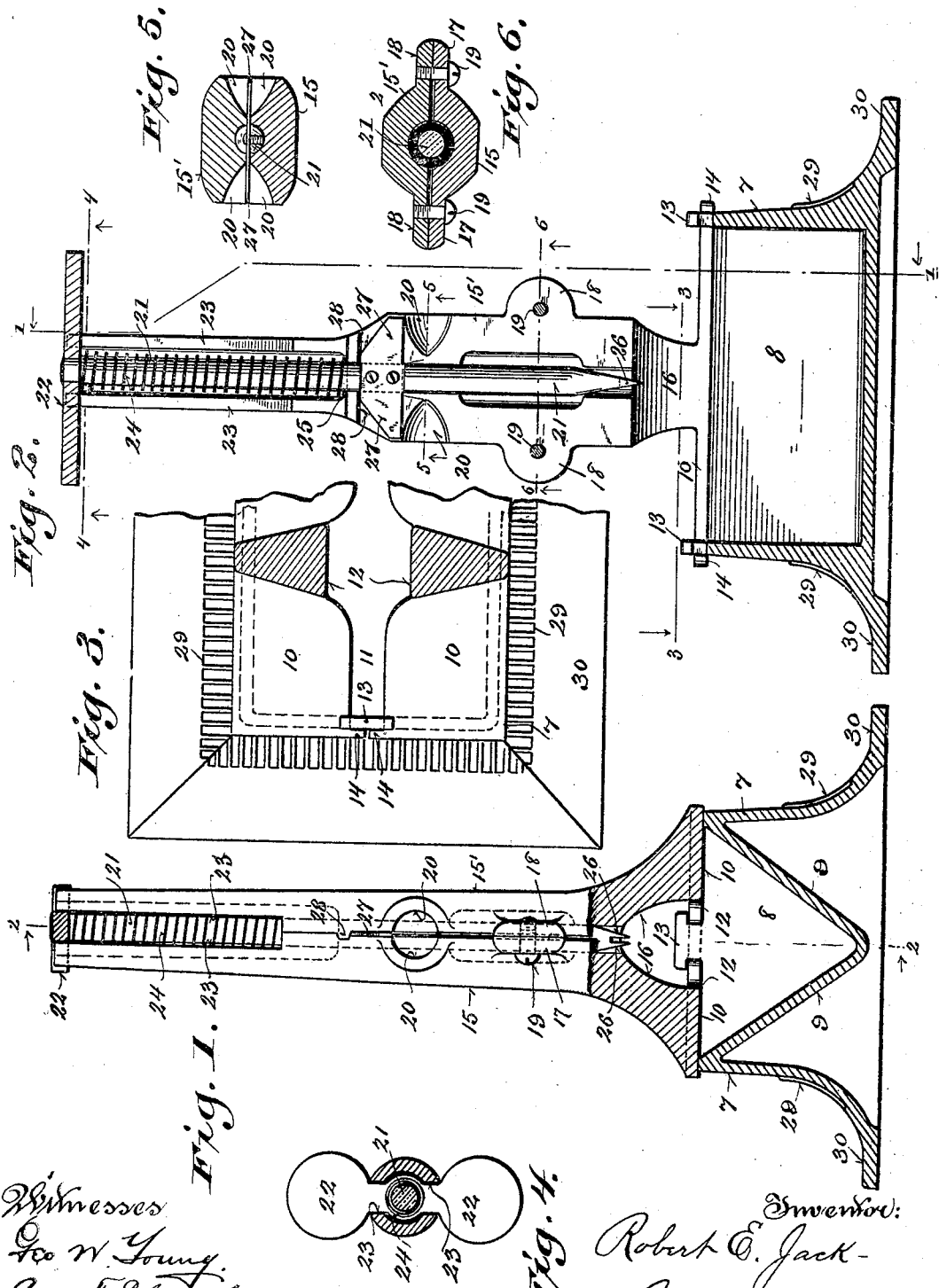

ROBERT E. JACK, OF MILWAUKEE, WISCONSIN, ASSIGNOR OF ONE-HALF TO FRED C. MITCHELL, OF MILWAUKEE, WISCONSIN.

COMBINED CIGAR-CUTTER AND MATCH HOLDING AND DELIVERING DEVICE.

No. 799,909.     Specification of Letters Patent.     Patented Sept. 19, 1905.

Application filed August 5, 1904. Serial No. 219,597.

*To all whom it may concern:*

Be it known that I, ROBERT E. JACK, residing in Milwaukee, in the county of Milwaukee and State of Wisconsin, have invented new and useful Improvements in a Combined Cigar-Cutter and Match Holding and Delivering Device, of which the following is a description, reference being had to the accompanying drawings, which are a part of this specification.

My invention has relation to a combined cigar-cutter and match holding and delivering device.

The object of the invention is to provide a device of the character referred to in which provision is made for cutting the end of a cigar (the cut being preferably in the form of a slit) and withdrawing a match from the box or safe by a single operation, the said operation being accomplished in a machine composed of but few parts, and hence embodying simplicity and cheapness in construction.

With the above primary object and other incidental objects in view the invention consists of the devices and parts or their equivalents, as hereinafter set forth.

In the accompanying drawings, Figure 1 is an edge elevation of the device, parts being in section on the plane indicated by the broken line 1 1 of Fig. 2, and also showing the lower portion of the plunger-casing broken away. Fig. 2 is a vertical sectional view on the plane indicated by the line 2 2 of Fig. 1. Fig. 3 is a plan view of the box or safe, the plunger-casing extending upwardly therefrom being sectioned on a horizontal plane just above the top of the box or safe, as indicated by the broken line 3 3 of Fig. 2. Fig. 4 is a horizontal section on the line 4 4 of Fig. 2. Fig. 5 is a horizontal section on the line 5 5 of Fig. 2, and Fig. 6 is a horizontal section on the line 6 6 of Fig. 2.

Referring to the drawings, the numeral 7 indicates a match box or safe, the match-chamber 8 thereof being formed by the end walls of the box in conjunction with downwardly slanting or inclined inner walls 9 9, which meet at their lower ends, thereby forming a converged match-chamber which is widest at its upper portion. The top of the box is preferably composed of two similar sections 10 10, the inner edges thereof being out of contact, so as to provide a match-slot 11, the slot being made wider at its center by recessing the opposite central portions of the edges of the slot outwardly, as indicated by the numerals 12 12, thereby facilitating the operation of the free insertion and removal of the matches. As a convenient means for detachably securing the top sections 10 to the box or safe and at the same time avoid the use of screws, bolts, or the like, I provide the upper edges of the ends of the box with projecting T-shaped lugs 13 13 and the outer ends of the inner edges of the sections 10 with inwardly-extending projections 14 14, which when the top sections are adjusted to the box are adapted to fit beneath the heads of the T-shaped lugs.

Rising upwardly from the respective top sections 10 are members 15 15', preferably integral with said top sections. These members are provided longitudinally with half-circular recesses, which when the sections are adjusted together form a circular passage or bore. The members 15 15' at their lower ends are curved or bent outwardly, as indicated by the numerals 16 16, and join the bordering edges of the match-slot at the portions of said edges where the recesses 12 are located. These outwardly bent or curved portions when the members 15 15' are fitted together form an arch over the wide portion of the match-slot, so as to prevent the said members from interfering with the free insertion or removal of the matches from the safe. From about the centers of the members 15 15' downwardly said members are widened to form flat inner faces, which bear against each other when the members are placed together. Projecting laterally from opposite side edges of these widened portions are ears or lugs. The set of ears of the member 15 are indicated by the numerals 17 17 and the set of ears of the member 15' by the numerals 18 18. These ears or lugs register, and screw-bolts 19 19 pass through alined openings therein, the openings in the ears 18 being threaded to receive the threaded ends of the bolts. These bolts 19 are the only bolts or screws employed throughout the entire structure for holding the parts together. The flat face of each of the members referred to is provided at a point preferably near the upper end of said flat face with inwardly-extending recesses 20 20, which extend inwardly from opposite edges and also taper inwardly, said recesses being so positioned on the respective members as to register when the members are brought together and to form a recess of substantially the shape of the tip or mouth end of a cigar.

Adapted to fit in registering longitudinal recesses in the members 15 15' and to reciprocate therein is a plunger 21. The two members 15 15' therefore form a casing for this plunger. The upper end of the plunger is provided with two oppositely-extending finger-pieces or handles 22 22, which work and are guided in opposite guide-slots 23 23, extending downwardly for a desired distance from the upper ends of the members 15 15'. Of course, if desired, only one of these outwardly-extending finger-pieces could be employed, and in that event only one of the slots 23 would be necessary. The upper portion of the plunger is encircled by a coiled spring 24, and the lower end of this spring is seated on shouldered portions 25, formed in the respective members of the plunger-casing. The upper end of the spring bears against the under side of the handle of the plunger. The lower end of the plunger is provided with sharp prongs 26 26, which are adapted, when the plunger is forced downwardly against the action of the spring, to engage a match and thereby lift said match out of the box or safe when the plunger makes its return upward or outward stroke. Of course only one prong could be provided; but two are preferable, as affording a more effective means for engaging a match.

At a desirable point between the ends of the plunger the said plunger is provided with outwardly-extending cutters or slitters 27 27, which when the plunger is in its normal raised position are located just above the recesses 20. It is obvious that only one of the recesses 20 could be provided; but in that event only one of the slitters would be necessary. The two recesses for the tip end of the cigar, however, are preferred, inasmuch as by the provision thereof a person can have the tip end of his cigar slitted from either side edge of the device. The inner face of the member 15' is provided with transverse shoulders 28 28, which form stops against which the knives contact on the upward movement of the plunger, whereby said upward movement of the plunger is limited.

As a matter of convenience the outer sides of the match box or safe may be provided with roughened surfaces 29 for lighting a match withdrawn from the box. I also prefer to project all four sides of the box outwardly to form a flat base 30, which not only serves as a firm foundation for the machine, but at the same time may be used to advantage as a means for displaying advertisements thereon—as, for instance, advertisements of certain brands of cigars.

In the operation of the device the mouth end or tip of a cigar is inserted into either of the recesses 20. The handle of the plunger is then grasped and said plunger forced downwardly against the action of the coiled spring. The knives by this movement are caused to travel across the recesses 20, and the mouth end of the cigar which is inserted in one of said recesses is slitted by the action of the knife relating to said particular recess. After the plunger has moved downwardly a certain distance its pronged lower end will enter the match box or safe, and the prongs will engage one of the matches, the V-shaped formation of the match-chamber of the box greatly facilitating the engagement. After this the force applied to the plunger is removed, and said plunger by the action of the coiled spring is caused to make a return upward or outward movement and carry therewith a match impaled on the lower end thereof, the upward movement of the plunger being limited by contact of the knives with the shoulders 28. By this outward movement of the plunger the match is raised up beneath the arched formation at the lower end of the plunger-casing, and hence is in convenient position to be grasped by the fingers and removed from the prongs.

While the particular details of construction hereinbefore described are preferred, inasmuch as they make it possible to cast the entire device in a very simple manner, and thereby cheapen to a great extent the cost of manufacture, and also make it possible to construct the machine with the fewest possible number of parts, which also contributes toward the inexpensiveness of the device, yet I do not wish to be understood as restricting myself specifically thereto, as my invention, broadly considered, comprehends the employment of a match box or safe provided with a match-slot, a member rising upwardly from the top of the box and provided with one or more recesses for the insertion therein of the tip or mouth end of a cigar, and a reciprocating knife-carrying plunger adapted on one movement thereof to slit or cut the end of the cigar inserted in the recess and in the same operation to engage a match in the box and withdraw said match upon the reverse movement of the plunger. It is further to be understood that I do not limit myself to the particular form of knife herein shown or described adapted for slitting the end of the cigar, inasmuch as the knife may be so constructed as to cut off the end of the cigar instead of slitting the same without departing from the spirit and scope of my invention. I desire, further, to be understood as not limiting the invention to the cutter, in combination with the match-box and the means for removing the matches from the box, but that the cutting mechanism may be employed independently of the box, or vice versa, the box and the match-removing mechanism independent of the cutter.

What I claim as my invention is—

1. In a device of the character set forth, the combination of the base having an open top, a standard rising therefrom and provided with a central bore, a slit extending laterally from said bore, and a socket in its side through which said slit extends, a plunger mounted in the central bore and adapted to be depressed into the base and having a match-grasping finger at its lower end, a blade carried by the plunger and playing in the said slit, and means for reciprocating the plunger.

2. The improved device herein set forth comprising a base having an open top, a standard rising from the base and arched over the open top of the same, said standard having a central bore extending upward from its arched lower portion, vertical slits extending laterally from the said bore to its sides, and article-receiving openings in its sides through which said slits extend, a plunger mounted in the central bore of the standard and having a match-grasping finger at its lower end adapted to be depressed into the base, blades secured to the plunger and extending laterally therefrom through the slits in the standard, and means for reciprocating said plunger.

In testimony whereof I affix my signature in presence of two witnesses.

ROBERT E. JACK.

Witnesses:
A. L. MORSELL,
ANNA F. SCHMIDTBAUER.